(12) United States Patent
Chen et al.

(10) Patent No.: US 8,576,571 B2
(45) Date of Patent: Nov. 5, 2013

(54) POWER BANK ASSEMBLY

(75) Inventors: Chia-Tien Chen, Hsin-Chu (TW);
Li-Pin Hsu, Hsin-Chu (TW)

(73) Assignee: Coretronic Corporation, Hsin-chu (TW)

( * ) Notice: Subject to any disclaimer, the term of this patent is extended or adjusted under 35 U.S.C. 154(b) by 229 days.

(21) Appl. No.: 13/186,795

(22) Filed: Jul. 20, 2011

(65) Prior Publication Data

US 2012/0033389 A1 Feb. 9, 2012

(30) Foreign Application Priority Data

Aug. 9, 2010 (CN) .......................... 2010 1 0251236

(51) Int. Cl.
*H05K 7/00* (2006.01)
(52) U.S. Cl.
USPC ........... 361/747; 361/730; 361/732; 361/752; 361/759
(58) Field of Classification Search
USPC ................. 361/728, 730, 732, 747, 753, 759, 361/679.2, 679.3, 800; 174/542, 561
See application file for complete search history.

(56) References Cited

U.S. PATENT DOCUMENTS

| 6,995,982 | B2* | 2/2006 | Gonzalez et al. | 361/758 |
| 7,535,721 | B2* | 5/2009 | Okoshi et al. | 361/752 |
| 2008/0017414 | A1* | 1/2008 | Puri et al. | 174/560 |
| 2009/0045562 | A1* | 2/2009 | Reisel et al. | 267/249 |
| 2009/0211804 | A1* | 8/2009 | Zhou et al. | 174/520 |

FOREIGN PATENT DOCUMENTS

TW    I264495    10/2006

* cited by examiner

*Primary Examiner* — Hoa C Nguyen
*Assistant Examiner* — Ahmad D Barnes
(74) *Attorney, Agent, or Firm* — Muncy, Geissler, Olds & Lowe, PLLC

(57) ABSTRACT

A power bank assembly includes a housing, a power bank casing, a clasp structure, and a fastening structure. The clasp structure is correspondingly formed on a first end of the housing and a first end of the power bank casing to enable the first end of the housing to engage with the first end of the power bank casing, and the clasp structure also allows the housing to rotate relative to the power bank casing and about the first end of the housing serving as a pivot. The fastening structure is correspondingly formed on the second end of the housing and the second end of the power bank casing, and the fastening structure secures the housing to the power bank casing when the second end of the housing touches the second end of the power bank casing.

7 Claims, 3 Drawing Sheets

POWER BANK ASSEMBLY

BACKGROUND OF THE INVENTION a. Field of the Invention

The invention relates to a power bank assembly.

b. Description of the Related Art

Referring to FIG. 1, a power bank 102 goes straight down to touch a bottom surface of a projector 104, and then screws 106 are tighten in a vertical direction to secure the power bank 102 to the projector 104. However, since the power bank 102 is vertically screwed to the bottom surface of the projector 104 and positioned adjacent to the center of the projector 104, the design freedom for the projector 104 is strictly restricted. Besides, except for the bottom surface, the power bank 102 fails to be fixed on the other surfaces of the projector 104, and the installation angle of the power bank 102 is unchangeable.

BRIEF SUMMARY OF THE INVENTION

The invention provides a power bank assembly enabling a power bank to be fixed at any installation angle on either surface of an electronic device to provide simplicity and flexibility in the assembling process.

Other objects and advantages of the invention may be further illustrated by the technical features broadly embodied and described as follows.

In order to achieve one or a portion of or all of the objects or other objects, one embodiment of the invention provides a power bank assembly. The power bank assembly includes a housing, a power bank casing, a clasp structure and a fastening structure. The housing is capable of accommodating components of an electronic device and has a first end and a second end opposite the first end. The power bank casing has a first end and a second end, the first end of the power bank casing is adjacent to the first end of the housing, and the second end of the power bank casing is adjacent to the second end of the housing. The clasp structure is correspondingly formed on the first end of the housing and the first end of the power bank casing to enable the first end of the housing to engage with the first end of the power bank casing, and the clasp structure also allows the housing to rotate relative to the power bank casing and about the first end of the housing serving as a pivot. The fastening structure is correspondingly formed on the second end of the housing and the second end of the power bank casing, and the fastening structure secures the housing to the power bank casing when the second end of the housing touches the second end of the power bank casing.

In one embodiment, the clasp structure includes a slot formed on the housing and a hook formed on the power bank casing.

In one embodiment, the fastening structure includes a screw hole formed on the second end of the housing, and a screw and a spring disposed on the second end of the power bank casing. The screw slides into the screw hole, and the screw and the spring press against each other.

In one embodiment, when a bottom surface of the housing touches a top surface of the screw, the housing forces the screw to move towards the bottom of the power bank casing and compresses the spring. Further, when the screw slides into the screw hole, the spring forces the screw to move towards the top of the power bank casing.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
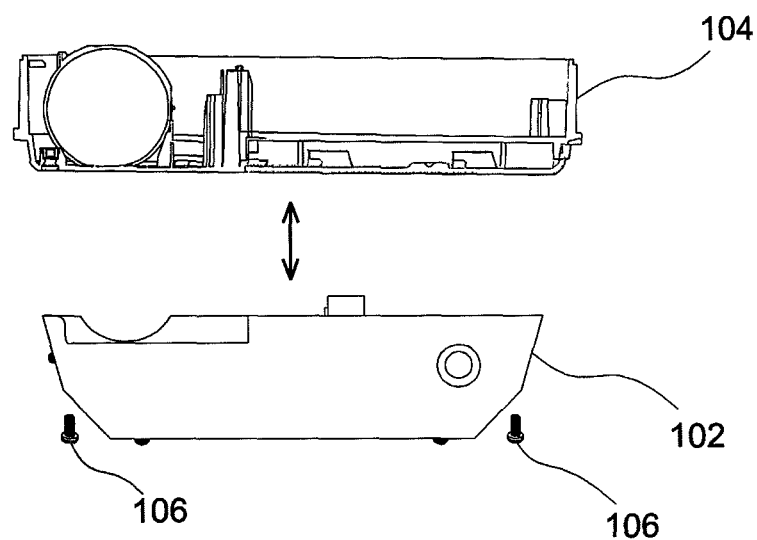
FIG. 1 shows a schematic diagram illustrating a conventional method of mounting a power bank on a projector.
Figure 2:
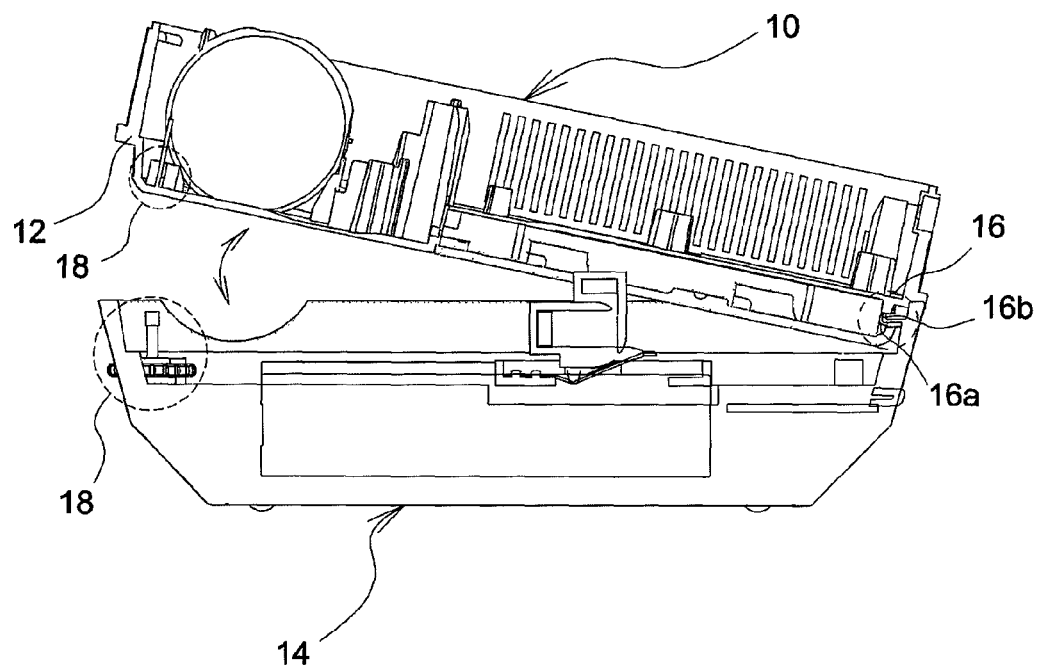
FIG. 2 and FIG. 3 show schematic diagrams of a power bank assembly according to an embodiment of the invention.
Figure 3:
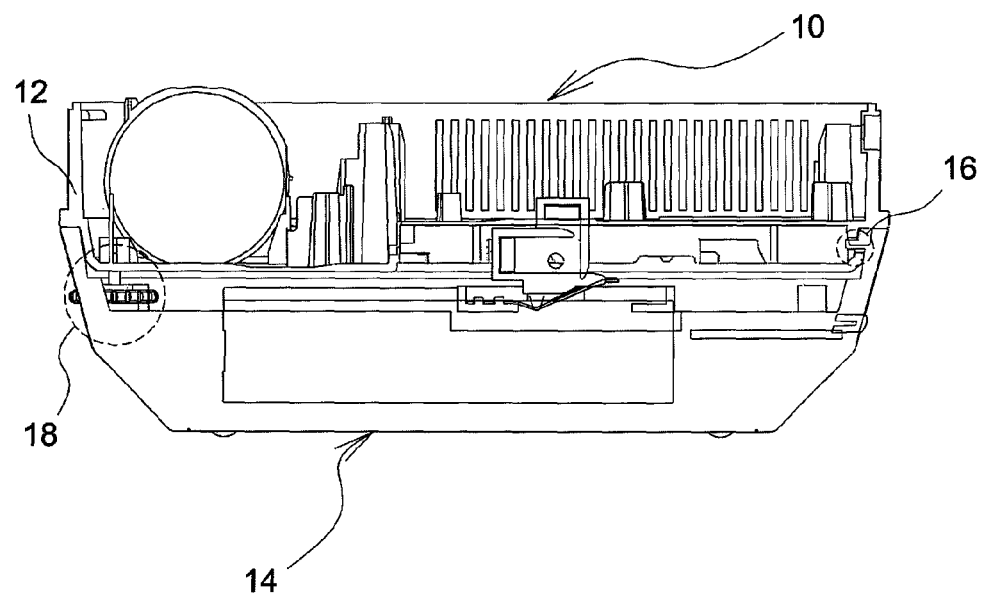

FIG. 2 and FIG. 3 both illustrate a power bank assembly mounted on an electronic device. The electronic device, for example, may be a projector 10 shown in FIG. 2 and FIG. 3 or a camera. The power bank assembly includes a housing 12, a power bank casing 14, a clasp structure 16, and a fastening structure 18. The housing 12 contains a space for accommodating components of an electronic device. For example, the housing 12 may accommodate an optical projection system to form a projector or accommodate an imaging system to form a camera. The housing 12 has a first end (such as a right end) and a second end (such as a left end) opposite the first end. The power bank casing 14 similarly has a first end (such as a right end) and a second end (such as a left end) opposite the first end. The first end of the power bank casing 14 is adjacent to the first end of the housing 12, and the second end of the power bank casing 14 is adjacent to the second end of the housing 12. As shown in FIG. 2, the clasp structure 16 is correspondingly formed on the right end of the housing 12 and the right end of the power bank casing 14 to enable the right end of the housing 12 to engage with the right end of the power bank casing 14. Therefore, the housing 12 is allowed to rotate, relative to the power bank casing 14, about the right end serving as a pivot. In this embodiment, the clasp structure 16 includes a slot 16a formed on the housing 12 and a hook 16b formed on the power bank casing 14. When the hook 16b is inserted into the slot 16a, one side of the housing 12 is confined to the power bank casing 14 and serves as a pivot, and the housing 12 rotates about the pivot. The fastening structure 18 is correspondingly formed on the left end of the housing 12 and the left end of the power bank casing 14. As shown in FIG. 3, when the left end of the housing 12 is rotated to touch the left end of the power bank casing 14, the fastening structure 18 secures the housing 12 to the power bank casing 14.

Figure 4:
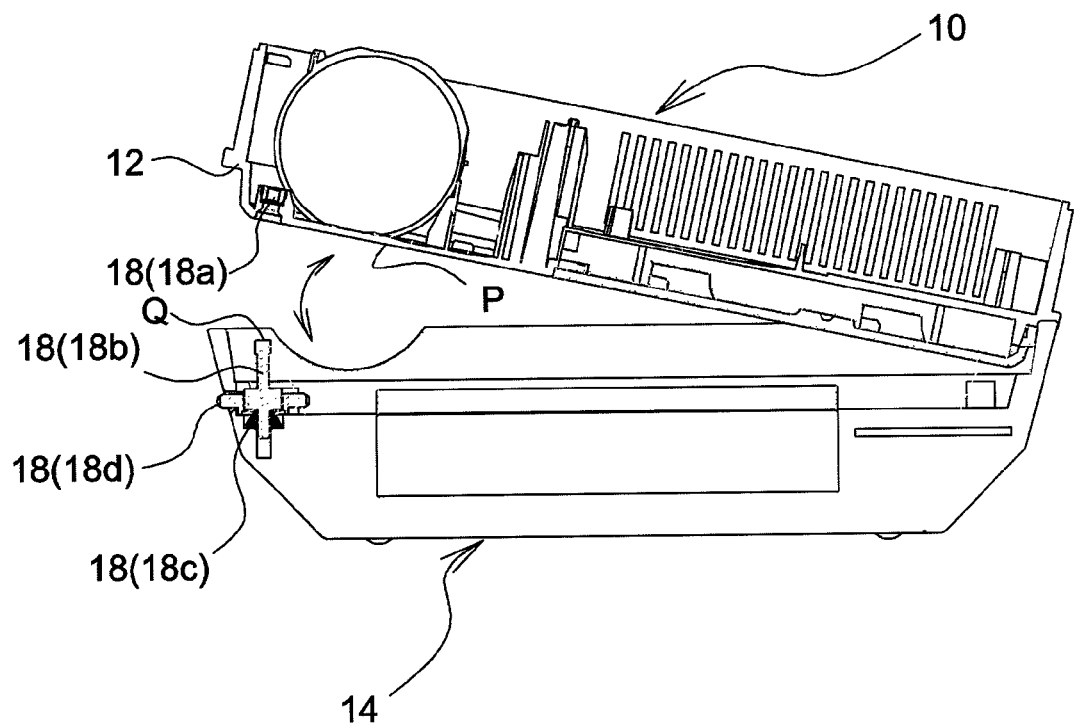
FIG. 4 shows a partial cross-section of FIG. 2.
Figure 5:
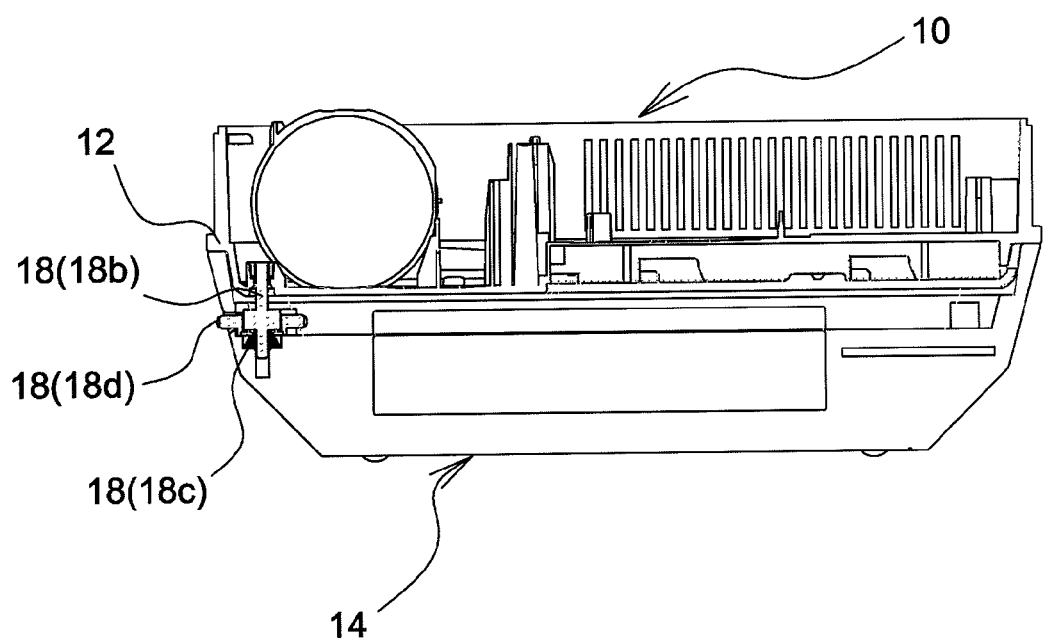
FIG. 5 shows a partial cross-section of FIG. 3.

Referring to both FIG. 4 and FIG. 5, in one embodiment, the fastening structure 18 includes a screw hole 18a formed on the left end of the housing 12 and a screw 18b and a spring 18c disposed on the left end of the power bank casing 14. The screw 18b and the spring 18c press against each other. As shown in FIG. 4, when the housing 12 rotates counterclockwise, a bottom surface P of the housing 12 first touches a top surface Q of the screw 18b, and then the housing 12 pushes the screw 18b downwards (forcing the screw 18b to move towards the bottom of the power bank casing 14) and meanwhile compresses the spring 18c. As the housing 12 further rotates, the screw 18b, as shown in FIG. 5, slides into the screw hole 18a, and meanwhile the spring 18c forces the screw 18b to move upwards (towards the top of the power bank casing 14). Afterward, the screw 18b is firmly tightened in the screw hole 18a to secure the entire housing 12 to the power bank casing 14. Since the housing 12 is naturally a part of an electronic device, the power bank casing 14 is therefore mounted on the electronic device (such as a projector or a camera) once the housing 12 is fixed on the power bank casing 14. In addition, the fastening structure 18 may further include a thumbwheel 18d. For example, the thumbwheel 18d may be turned by moving an exposed edge with a finger to firmly tighten the screw 18d.

According to the above embodiments, since one end of the housing 12 engages with one end of the power bank casing 14 first, the housing 12 is allowed to rotate, relative to the power bank casing 14, about the end serving as a pivot. When the other end of the housing 12 is rotated to touch the other end of the power bank casing 14, the fastening structure 18 secures the housing 12 to the power bank casing 14. Therefore, the power bank casing 14 is allowed to be fixed at any installation angle on either surface of an electronic device.

In one embodiment, the housing 12 has a contact surface (such as the bottom surface P) touching the power bank casing 14, and one end of the housing 12 engages one end of the power bank casing 14 in a direction substantially parallel to the contact surface. Further, the components of the clasp structure 16 and the fastening structure 18 are not limited, as long as the connecting and fastening effects are provided.

In summary, the embodiment or the embodiments of the invention may have at least one of the following advantages. Since one end of the housing engages with one end of the power bank casing first, the housing is allowed to rotate, relative to the power bank casing, about the end serving as a pivot. When the other end of the housing is rotated to touch the other end of the power bank casing, the fastening structure secures the housing to the power bank casing. Therefore, the power bank casing is allowed to be fixed at any installation angle on either surface of an electronic device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A power bank assembly, comprising:
   a housing having a space defined therein for accommodating components of an electronic device and having a first end and a second end opposite the first end;
   a power bank casing having a first end and a second end, wherein the first end of the power bank casing is adjacent to the first end of the housing, and the second end of the power bank casing is adjacent to the second end of the housing;
   a clasp structure correspondingly formed on the first end of the housing and the first end of the power bank casing to enable the first end of the housing to engage with the first end of the power bank casing and to allow the housing to rotate relative to the power bank casing and about the first end of the housing serving as a pivot; and
   a fastening structure correspondingly formed on the second end of the housing and the second end of the power bank casing, the fastening structure comprising:
   a screw hole formed on the second end of the housing; and
   a screw and a spring correspondingly disposed on the second end of the power bank casing, wherein the housing touches a top surface of the screw to force the screw to move towards a bottom of the power bank casing and compress the spring, and the screw pushed by the housing is forced by the spring to slide into the screw hole and tightened in the screw hole to secure the housing to the power bank casing.

2. The power bank assembly as claimed in claim 1, wherein the clasp structure comprises a slot formed on the housing and a hook formed on the power bank casing.

3. The power bank assembly as claimed in claim 1, wherein the housing has a contact surface touching the power bank casing, and the first end of the housing engages with the first end of the power bank casing in a direction substantially parallel to the contact surface.

4. The power bank assembly as claimed in claim 1, wherein, when the screw slides into the screw hole, the spring forces the screw to move towards the top of the power bank casing.

5. The power bank assembly as claimed in claim 1, wherein the fastening structure further comprises a thumbwheel and the thumbwheel is turned to tighten the screw.

6. The power bank assembly as claimed in claim 1, wherein the electronic device is a projector.

7. The power bank assembly as claimed in claim 1, wherein the electronic device is a camera.

* * * * *